US010226975B2

(12) United States Patent
Ichinose et al.

(10) Patent No.: US 10,226,975 B2
(45) Date of Patent: Mar. 12, 2019

(54) FITTING DEVICE FOR TIRE ASSEMBLY AND FITTING METHOD FOR TIRE ASSEMBLY (71) Applicant: HONDA MOTOR CO., LTD., Minato-ku, Tokyo (JP)

(72) Inventors: Hidemi Ichinose, Tokyo (JP); Yoshiteru Tsuji, Nagoya (JP); Masaru Nishiyama, Obu (JP)

(73) Assignee: Honda Motor Co., Ltd., Tokyo (JP)

( * ) Notice: Subject to any disclaimer, the term of this patent is extended or adjusted under 35 U.S.C. 154(b) by 169 days.

(21) Appl. No.: 15/504,460

(22) PCT Filed: Apr. 28, 2015

(86) PCT No.: PCT/JP2015/062766
§ 371 (c)(1),
(2) Date: Feb. 16, 2017

(87) PCT Pub. No.: WO2016/031303
PCT Pub. Date: Mar. 3, 2016

(65) Prior Publication Data
US 2017/0225527 A1 Aug. 10, 2017

(30) Foreign Application Priority Data
Aug. 28, 2014 (JP) .................. 2014-174582

(51) Int. Cl.
B60C 25/12 (2006.01)
B60C 25/14 (2006.01)

(52) U.S. Cl.
CPC .............. B60C 25/14 (2013.01); B60C 25/12 (2013.01)

(58) Field of Classification Search
CPC ....... B60C 25/14; B60C 25/12; B60C 25/122; B60C 25/125; B60C 25/025; B60C 25/13
USPC ................................................ 157/1.17, 1.28
See application file for complete search history.

(56) References Cited

U.S. PATENT DOCUMENTS 4,641,699 A * 2/1987 Giles ..................... B60C 25/025
157/1.17
7,426,953 B2 * 9/2008 Baker ..................... B60C 25/13
157/1.17

FOREIGN PATENT DOCUMENTS

JP 4223469 B2 2/2009

OTHER PUBLICATIONS

PCT/ISA/210, with the English translation thereof, from PCT/JP2015/062766.

* cited by examiner

Primary Examiner — Hadi Shakeri
(74) Attorney, Agent, or Firm — Carrier Blackman & Associates, P.C.; Joseph P. Carrier; William D. Blackman (57) ABSTRACT A tire fitting device includes: an arm for moving toward a tire; a striking roller for applying a striking force in the vicinity of a bead part, the striking roller being attached to the arm; a receiving roller for receiving the tire to which the striking force is applied; and an elastic member for elastically supporting the receiving roller.

5 Claims, 6 Drawing Sheets

FITTING DEVICE FOR TIRE ASSEMBLY AND FITTING METHOD FOR TIRE ASSEMBLY

BACKGROUND OF THE INVENTION

Technical Field

The present invention relates to a fitting device for applying a striking force to a tire of a tire assembly as well as to a fitting method for such a tire assembly.

Background Art

A tire assembly is composed of a wheel and a tire fitted onto the wheel. More specifically, bead portions of the tire are fitted onto a rim part of the wheel. If such fitting is insufficient, gaps can be formed between the rim part and the bead portions. Such gaps have an influence on traveling of the vehicle.

When intervening air residing within the gaps is expelled, the bead portions can be brought into tight contact with the rim part, and if such tight contact is achieved, the gaps disappear.

Conventionally, a technique of striking in the vicinity of the bead portions of the tire with a hammer in order to flush out air has been known (see, for example, Patent Document 1).

The fitting device disclosed in Patent Document 1 is equipped with an upper hammer above the tire assembly, and a lower hammer below the tire assembly. The tire contains a pair of bead portions. A location in the vicinity of one of the bead portions is struck with the upper hammer, and a location in the vicinity of another of the bead portions is struck with the lower hammer in order to expel air.

If, after the location in the vicinity of the one bead portion has been struck, the tire is inverted and the location in the vicinity of the other bead portion is struck, the operation time is lengthened. However, in Patent Document 1, since the pair of bead portions are struck simultaneously, the operation time is made shorter.

However, in the fitting device according to Patent Document 1, it is necessary to drive the upper hammer and the lower hammer individually, resulting in complexity of the driving mechanism. As a result, the fitting device becomes high in cost.

In attempting to realize a reduction in cost of the fitting device, a fitting device having a simple structure and which does not extend the operation time has been desired.

PRIOR ART DOCUMENTS

Patent Documents

Patent Document 1: Japanese Patent No. 4223469

SUMMARY OF INVENTION

Task to be Solved by the Invention

The present invention has the object of providing a fitting device for a tire assembly which is both simple in structure and inexpensive.

Solution for the Task

The invention according to a first aspect is characterized by a fitting device for a tire assembly, which applies a striking force in the vicinity of a pair of bead portions of a tire assembled onto a wheel, so as to increase adhesion between the wheel and the tire, including:

an arm configured to move toward the tire;
a striking roller attached to the arm and configured to apply a striking force in the vicinity of the bead portions;
a receiving roller configured to receive the tire to which the striking force is applied; and
an elastic member configured to elastically support the receiving roller;

wherein, within the vicinity of the pair of bead portions, the striking force is applied, by the striking roller, in the vicinity of one of the bead portions, and a reaction force is applied, by the receiving roller, in the vicinity of another of the bead portions.

The invention according to a second aspect is characterized by a fitting device for a tire assembly, which applies a striking force in the vicinity of a pair of bead portions of a tire assembled onto a wheel, so as to increase adhesion between the wheel and the tire, including:

an arm configured to move toward the tire;
a striking roller attached to the arm and configured to apply a striking force in the vicinity of the bead portions;
a receiving roller configured to receive the tire to which the striking force is applied; and
an elastic member configured to elastically support the receiving roller;

wherein, within the vicinity of the pair of bead portions, the striking force is applied, by the striking roller, in the vicinity of one of the bead portions, whereby the receiving roller that receives the tire vibrates up and down.

In the invention according to a third aspect, preferably, the elastic member is a compressible fluid pressure cylinder.

In the invention according to a fourth aspect, preferably, the elastic member is equipped with a damper in which a non-compressible fluid is sealed, and a spring configured to press the receiving roller back to the vicinity of the other bead portion.

The invention according to a fifth aspect is characterized by a fitting method for a tire assembly, in which a striking force is applied in the vicinity of a pair of bead portions of a tire assembled onto a wheel, so as to increase adhesion between the wheel and the tire, including the steps of:

placing the tire on a receiving roller that is elastically supported by an elastic member,
applying a striking force in the vicinity of one of the bead portions, by a striking roller that is provided on an arm configured to move toward the tire placed on the receiving roller; and
applying a reaction force by the receiving roller in the vicinity of another of the bead portions, the reaction force having a magnitude corresponding to a combination of the wheel and the tire, and a magnitude of the striking force by the striking roller.

Effect of the Invention

Conventionally, striking has been applied to a pair of bead portions of a tire using an upper striking roller and a lower striking roller, individually and separately.

Concerning this point, with the invention according to the first aspect, the lower striking roller is eliminated by replacing the lower striking roller with the receiving roller. The lower striking roller according to the conventional technique required a swing arm, a cam for swinging the swing arm, and an electric motor for rotating the cam. However, according to the present invention, the swing arm, the cam, and the motor for the lower striking roller are rendered unnecessary in their entirety.

As a result, according to the present invention, a fitting device for a tire assembly is provided, which is both simple in structure and inexpensive.

With the invention according to the second aspect, in the same manner as the first aspect, the lower swing arm, the lower cam, and the lower motor are rendered unnecessary in their entirety. As a result, according to the present invention, a fitting device for a tire assembly is provided, which is both simple in structure and inexpensive.

In addition, since the receiving roller is vibrated, the lower bead portion can be smoothly fitted onto the rim part.

In the invention according to the third aspect, the elastic member is a compressible fluid pressure cylinder. The compressible fluid pressure cylinder may be exemplified by an air spring, for example. Such a compressible fluid pressure cylinder makes use of the compressibility of the fluid, and therefore, the structure thereof is both simple and inexpensive.

In the invention according to the fourth aspect, the elastic member is equipped with the damper and the spring. Such a damper and a spring are easily available and are inexpensive. In addition, it is possible to associate a speed control mechanism with the damper, and thus, the reaction force can be changed in accordance with the size of the tire.

According to the invention of the fifth aspect, the striking force is applied by the striking roller in the vicinity of one of the bead portions of the tire, whereas the reaction force is applied by the receiving roller in the vicinity of the other of the bead portions.

Thus, in the same manner as the first aspect, according to the present invention, the lower swing arm, the lower cam, and the lower motor of the conventional technique are rendered unnecessary in their entirety.

As a result, according to the present invention, a fitting method for a tire assembly can be provided, which is both simple in structure and inexpensive.

DETAILED DESCRIPTION OF EMBODIMENTS OF THE INVENTION

An embodiment of the present invention will be described below with reference to the accompanying drawings.

Embodiment

Figure 1:
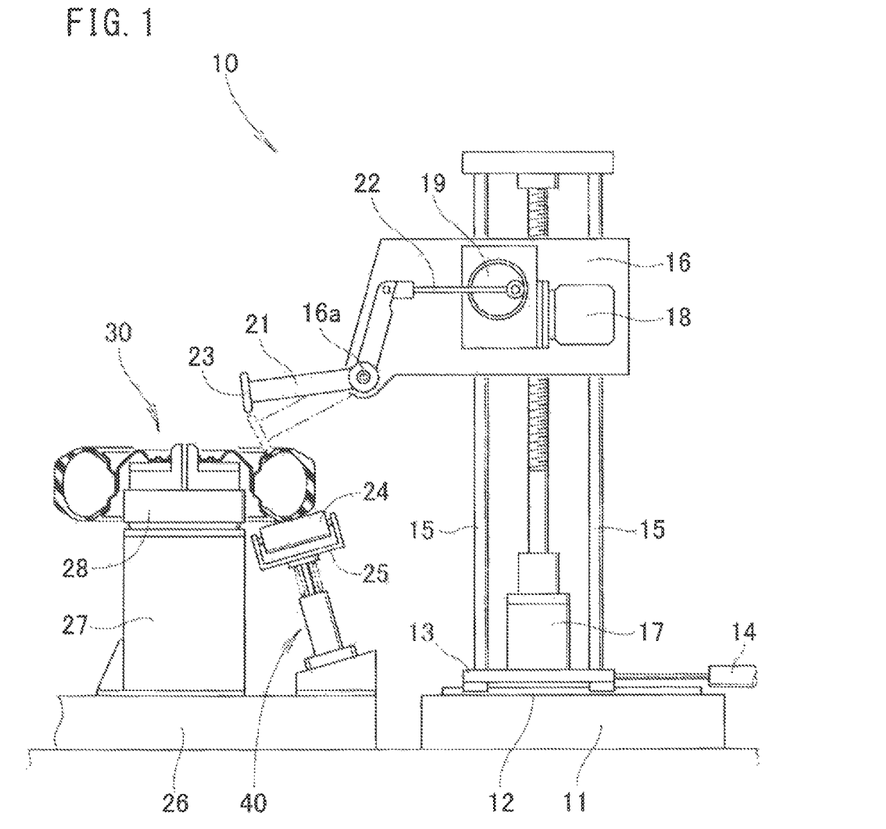
FIG. 1 is a side view of a fitting device according to the present invention.

As shown in FIG. 1, a fitting device 10 is equipped with a pedestal 11, a rail 12 laid horizontally on an upper surface of the pedestal 11, a slider 13 which is mounted on the rail 12 for horizontal movement thereon, a moving cylinder 14 that moves the slider 13, two support posts 15, 15 erected on the slider 13, a lifting plate 16 that moves up and down while being guided by the support posts 15, 15, a jack mechanism 17 for raising and lowering the lifting plate 16, a cam rotating mechanism 18 attached to the lifting plate 16, a cam 19 that is rotated by the cam rotating mechanism 18, a V-shaped arm 21 which is swingably mounted on the lifting plate 16 by a pin 16a, a connecting rod 22 that connects a proximal portion of the arm 21 with the cam 19, a striking roller 23 disposed on a distal end of the arm 21, a receiving roller 24 disposed face-to-face with the striking roller 23, a bracket 25 that rotatably supports the receiving roller 24, an elastic member 40 that elastically supports the bracket 25, another pedestal 26, a post 27 that extends upwardly from the pedestal 26, and an assembly support member 28 supported in a horizontally rotatable manner on the post 27 and which supports a tire assembly 30.

By the moving cylinder 14, the striking roller 23 and the like can be moved horizontally to a standby position. While on standby, a space above the tire assembly 30 can be opened, and the tire assembly 30 can be removed upwardly and introduced from the above.

Figure 2:
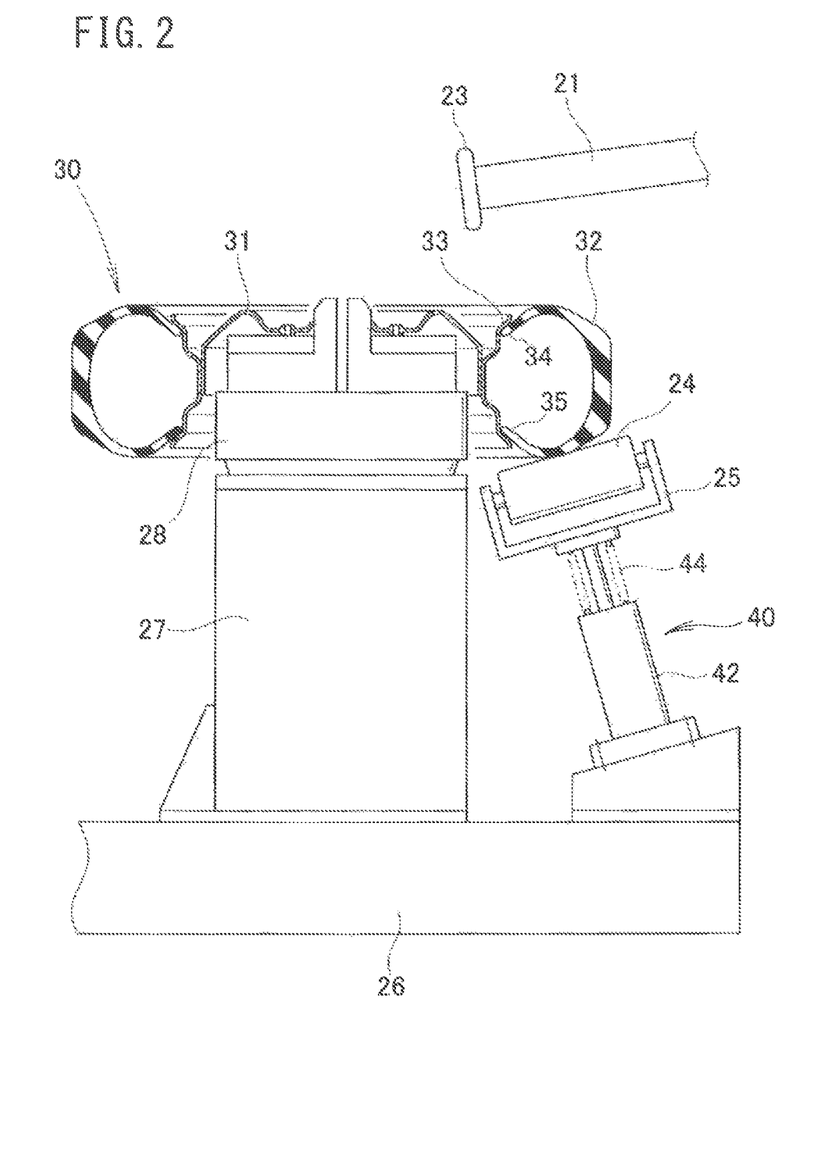
FIG. 2 is an enlarged view of main parts shown in FIG. 1.

As shown in FIG. 2, the tire assembly 30 includes a wheel 31 and a tire 32 which has been mounted on the wheel 31 in a previous step. However, in the preceding step, adhesion of the tire 32 to the wheel 31 is low, and gaps are present between a rim part 33 of the wheel 31 and bead portions 34, 35 of the tire 32. Air exists within such gaps. By operation of the fitting device 10, the air is expelled, and the gaps become close to non-existent.

The tire assembly 30 is placed on the assembly support member 28. The receiving roller 24 and the elastic member 40 are disposed below the tire 32, and the striking roller 23 and the arm 21 are disposed above the tire 32.

Figure 3:
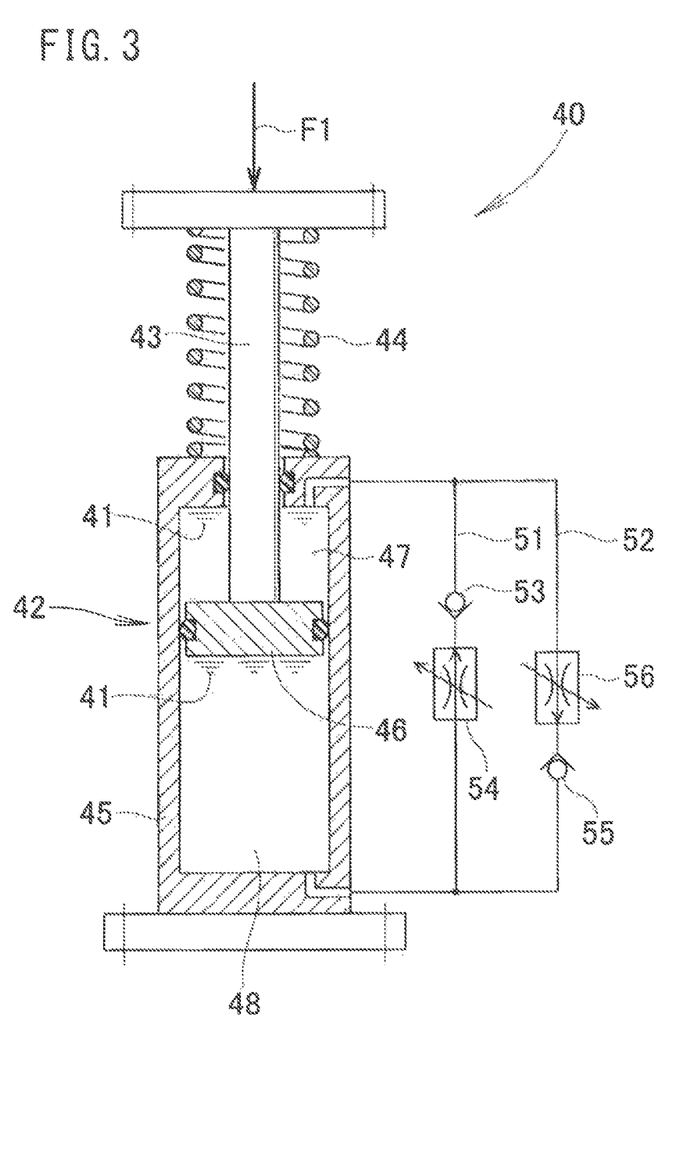
FIG. 3 is a cross-sectional view of an elastic member.

As shown in FIG. 3, the elastic member 40, for example, is a strut damper including a damper 42 in which a non-compressible fluid (for example, oil) 41 is enclosed and sealed, and a spring 44 for pressing a piston rod 43 back to its original position.

The damper 42 is made up from a cylinder 45, a piston 46 accommodated in the interior of the cylinder 45 movably in an axial direction, and the piston rod 43 that extends from the piston 46. The interior of the damper 42 is partitioned into an upper chamber 47 and a lower chamber 48 by the piston 46.

Preferably, the upper chamber 47 and the lower chamber 48 are connected by external flow passages 51, 52. Further, a first check valve 53 and a first throttle valve 54 are provided in the external flow passage 51. Further, a second check valve 55 and a second throttle valve 56 are provided in the external flow passage 52. The first and second throttle valves 54, 56 are needle valves referred to as speed control valves.

When an impact force F1 is applied to the distal end of the piston rod 43, the spring 44 contracts and the piston 46 descends. When the piston 46 descends, the fluid 41 inside the lower chamber 48 moves into the upper chamber 47 through the external flow passage 51. At this time, the speed of descent becomes faster when the first throttle valve 54 opens, and becomes slower when the first throttle valve 54 narrows and throttles the fluid 41.

When the impact force F1 decreases, the spring 44 extends and the piston 46 rises. When the piston 46 rises, the fluid 41 inside the upper chamber 47 moves into the lower chamber 48 through the external flow passage 52. At this time, the ascension speed becomes faster when the second throttle valve 56 opens, and becomes slower when the second throttle valve 56 narrows and throttles the fluid 41.

Figure 4:
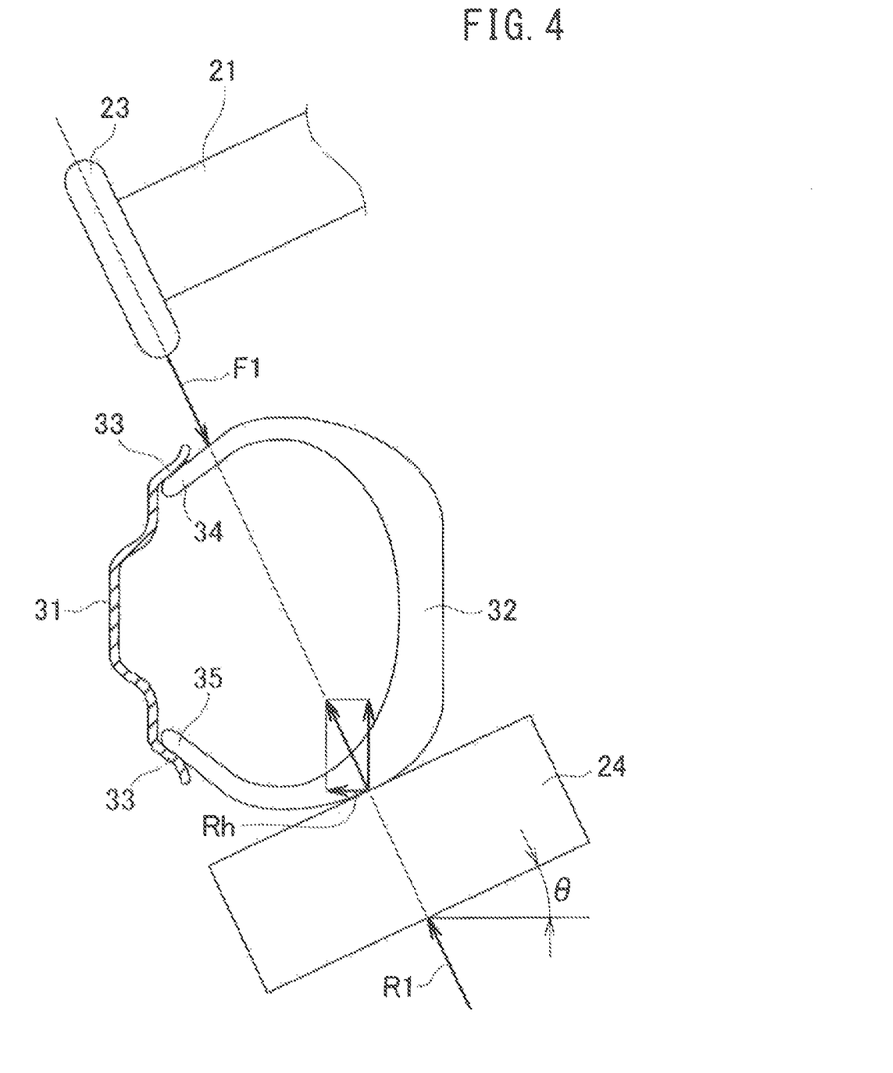
FIG. 4 is an explanatory diagram of operations.

As shown in FIG. 4, the receiving roller 24 is inclined at an angle of θ with respect to the horizontal direction. The angle of inclination thereof is set from 20° to 30°.

When the striking roller 23 strikes in the vicinity of the one bead portion 34, the one bead portion 34 vibrates and is fitted suitably onto the rim part 33. At the same time, the receiving roller 24 generates a reaction force R1. Vibrations from the one bead portion 34 are transmitted through the tire 32 and cause the other bead portion 35 to vibrate. When the other bead portion 35 is vibrated, the receiving roller 24 vibrates as well. Thus, the receiving roller 24 imparts a vibratory reaction force to the other bead portion 35.

Incidentally, in the case of FIG. 2, if the receiving roller 24 were directly supported on the pedestal 26 without the elastic member 40 being interposed therebetween, it would be possible for a large reaction force to be generated instantaneously. However, since the receiving roller 24 does not vibrate up and down, only a horizontal component of the reaction force would be generated. If the other bead portion 35 were to become locally caught on or hooked over the rim part 33, further fitting of the tire could not proceed.

Concerning this point, according to the present invention, because of the interposition of the elastic member 40, the receiving roller 24 also moves upwardly while vibrating up and down. Upon doing so, a horizontal component also is accompanied with the components of vibration, the other bead portion 35 does not become hooked on the rim part 33, and fitting thereof proceeds. More specifically, by the receiving roller 24 vibrating up and down, local catching or hooking of the other bead portion 35 onto the rim part 33 can be prevented. Thus, due to such vibrations, the bead portion 35 can be fitted more smoothly onto the rim part 33.

In the case that the size or hardness of the tire 32 changes, the degree at which the first throttle valve 54 and the second throttle valve 56 shown in FIG. 3 are opened is adjusted.

Next a modification of the elastic member 40 will be described.

Figure 5:
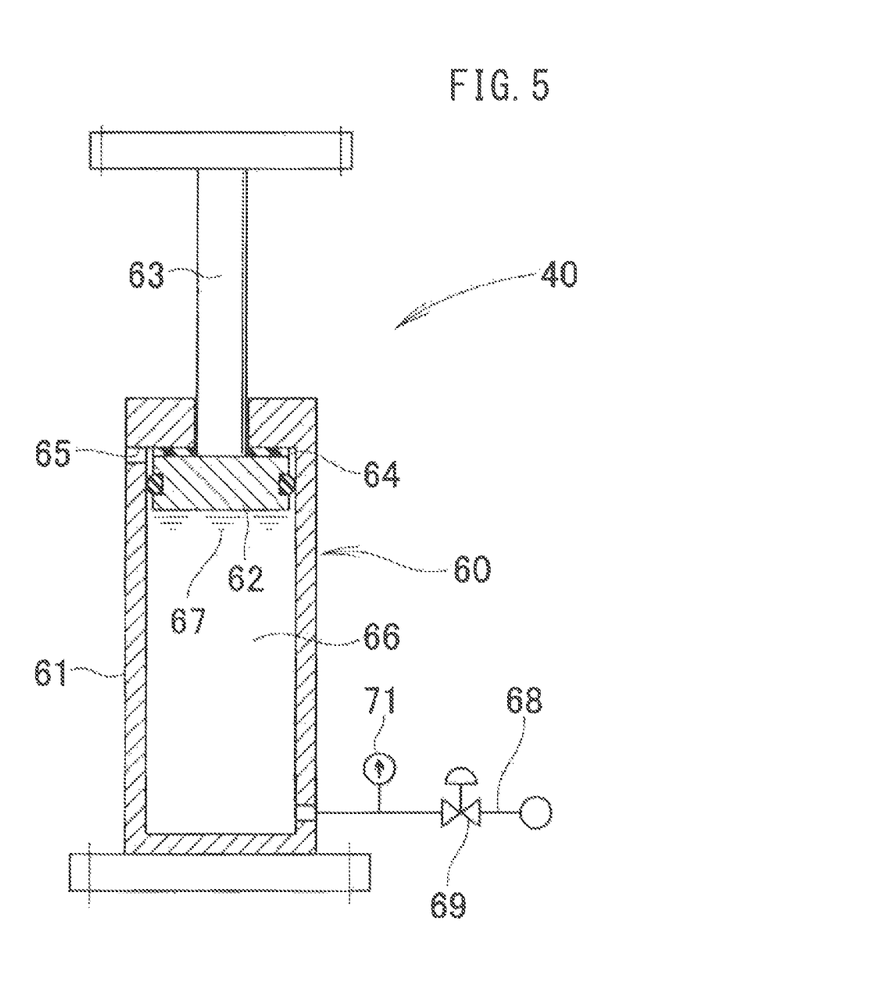
FIG. 5 is a cross-sectional view of another elastic member.

As shown in FIG. 5, the elastic member 40 is a compressible fluid pressure cylinder 60 referred to as an air damper. The compressible fluid pressure cylinder 60 is made up from a cylinder 61, a piston 62 accommodated movably in the interior of the cylinder 61, and a piston rod 63 that extends from the piston 62. In the present example, outside air (air) is introduced into an upper chamber 64 of the cylinder 61 via an air vent 65, and a compressible fluid 67, which serves as a working medium, is enclosed and sealed in a lower chamber 66 of the cylinder 61. The compressible fluid 67 is a gas such as nitrogen gas. Preferably, a fluid supply passage 68 is connected to the lower chamber 66, and a pressure adjusting valve 69 and a pressure gauge 71 are provided in the fluid supply passage 68.

Figure 6:
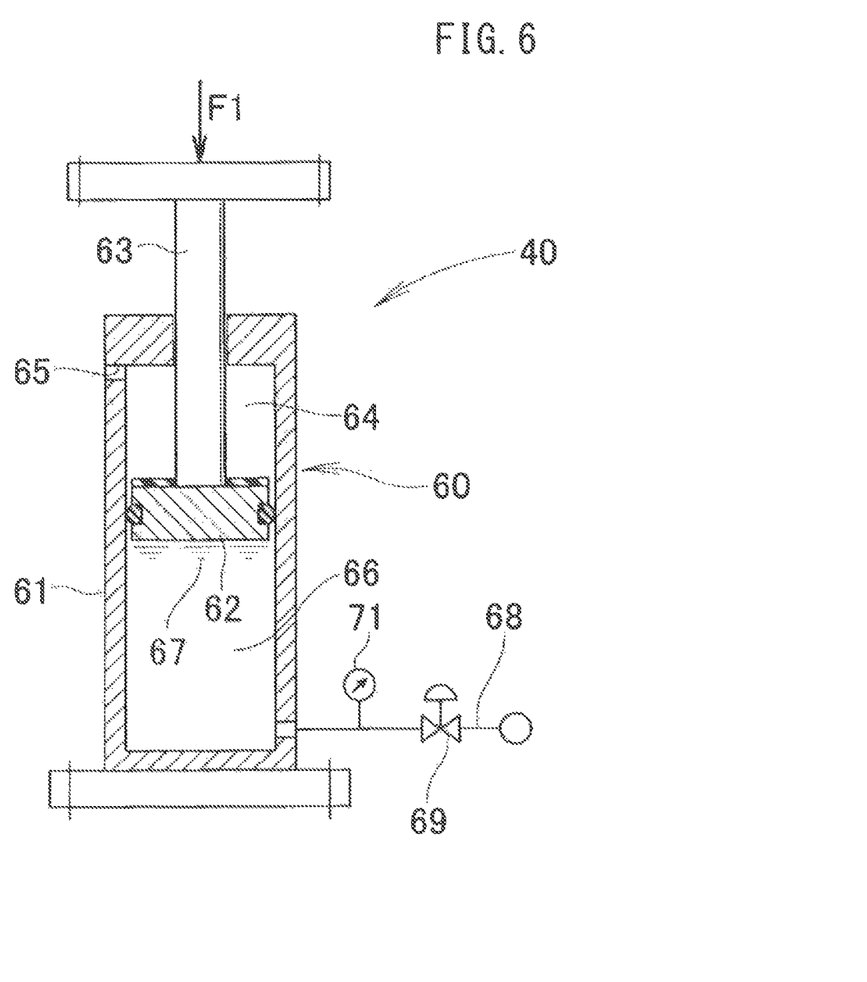
FIG. 6 is a diagram showing operations of the other elastic member.

As shown in FIG. 6, upon receiving the impact force F1, the compressible fluid 67 in the lower chamber 66 is compressed, and the piston 62 and the piston rod 63 are lowered. When the pressure in the lower chamber 66 rises and the reaction force increases to F1, movement of the piston 62 is stopped.

If the force F1 decreases, the compressible fluid 67 attempts to return to its original pressure, whereupon the piston 62 and the piston rod 63 are raised. More specifically, the compressible fluid 67 fulfills the roll of a damper and a spring.

In FIG. 5, the initial pressure of the lower chamber 66 can be adjusted by the pressure adjusting valve 69. When the pressure increases, the spring constant can be increased, and when the pressure decreases, the spring constant can also be decreased. Thus, changes in tire sizes can be handled.

Moreover, the elastic member 40 may be a coil spring, a disc spring, or a leaf spring.

INDUSTRIAL APPLICABILITY

The present invention can be suitably applied to a fitting technique for a tire assembly that is assembled onto a vehicle.

DESCRIPTION OF REFERENCE CHARACTERS

10 . . . fitting device for tire assembly
21 . . . arm
23 . . . striking roller
24 . . . receiving roller
30 . . . tire assembly
31 . . . wheel
32 . . . tire
33 . . . rim part
34 . . . one bead portion
35 . . . other bead portion
40 . . . elastic member
41 . . . non-compressible fluid
42 . . . damper
44 . . . spring
60 . . . compressible fluid pressure cylinder
67 . . . compressible fluid
F1 . . . striking force
R1 . . . reaction force
Rh . . . horizontal component of reaction force

The invention claimed is:

1. A fitting device for a tire assembly, which applies a striking force in vicinity of a pair of bead portions of a tire assembled onto a wheel, so as to increase adhesion between the wheel and the tire, comprising:
    an arm configured to move toward the tire;
    a striking roller attached to the arm and configured to apply a striking force in vicinity of the bead portions;
    a receiving roller configured to receive the tire to which the striking force is applied; and
    an elastic member configured to elastically support the receiving roller;
    wherein, within vicinity of the pair of bead portions, the striking force is applied, by the striking roller, in vicinity of one of the bead portions, and a reaction force is applied, by the receiving roller, in vicinity of the other bead portion.

2. A fitting device for a tire assembly, which applies a striking force in vicinity of a pair of bead portions of a tire assembled onto a wheel, so as to increase adhesion between the wheel and the tire, comprising:
    an arm configured to move toward the tire;
    a striking roller attached to the arm and configured to apply a striking force in vicinity of the bead portions;
    a receiving roller configured to receive the tire to which the striking force is applied; and
    an elastic member configured to elastically support the receiving roller;
    wherein, within vicinity of the pair of bead portions, the striking force is applied, by the striking roller, in vicinity of one of the bead portions, whereby the receiving roller that receives the tire vibrates up and down.

3. The fitting device for a tire assembly according to claim 1, wherein the elastic member is a compressible fluid pressure cylinder.

4. The fitting device for a tire assembly according to claim 1, wherein the elastic member comprises a damper in which a non-compressible fluid is sealed, and a spring configured to press the receiving roller back to the vicinity of the other bead portion.

5. A fitting method for a tire assembly, in which a striking force is applied in vicinity of a pair of bead portions of a tire assembled onto a wheel, so as to increase adhesion between the wheel and the tire, comprising the steps of:
- placing the tire on a receiving roller that is elastically supported by an elastic member,
- applying a striking force in vicinity of one of the bead portions, by a striking roller that is provided on an arm configured to move toward the tire placed on the receiving roller; and
- applying a reaction force by the receiving roller in vicinity of the other bead portion, the reaction force having a magnitude corresponding to a combination of the wheel and the tire, and a magnitude of the striking force by the striking roller.

* * * * *